(12) United States Patent
Dorninger et al.

(10) Patent No.: US 7,651,326 B2
(45) Date of Patent: Jan. 26, 2010

(54) CALIBRATING PLATE FOR AN EXTRUSION DIE FOR PRODUCING PLASTIC PROFILES

(75) Inventors: Frank Dorninger, Micheldorf (AT); Uwe Schimmel, Kremsmuenster (AT)

(73) Assignee: Technoplast Kunststofftechnik GmbH & Co. KG, Micheldorf (AT)

( * ) Notice: Subject to any disclaimer, the term of this patent is extended or adjusted under 35 U.S.C. 154(b) by 422 days.

(21) Appl. No.: 11/819,488

(22) Filed: Jun. 27, 2007

(65) Prior Publication Data

US 2008/0044507 A1 Feb. 21, 2008

(30) Foreign Application Priority Data

Jun. 29, 2006 (AT) ............... A 1100/2006

(51) Int. Cl.
*B29C 47/90* (2006.01)

(52) U.S. Cl. .............. 425/71; 425/183; 425/192 R; 425/326.1; 425/384; 425/388

(58) Field of Classification Search ............ 425/71, 425/183, 192 R, 326.1, 384, 388

See application file for complete search history.

(56) References Cited

U.S. PATENT DOCUMENTS

| | | | | |
|---|---|---|---|---|
| 4,685,879 A | * | 8/1987 | Purstinger et al. | ........... 425/383 |
| 5,626,807 A | | 5/1997 | O'Halloran | |
| 6,779,994 B2 | * | 8/2004 | Krumbock et al. | ......... 425/72.1 |

| | | | | |
|---|---|---|---|---|
| 2003/0219503 A1 | * | 11/2003 | Kossl | ........... 425/71 |

FOREIGN PATENT DOCUMENTS

| | | | |
|---|---|---|---|
| AT | 003321 U1 | * | 1/2000 |
| DE | 29906109 U1 | * | 7/1999 |
| DE | 10222922 | | 12/2002 |
| EP | 0936053 | | 8/1999 |
| GB | 2378411 | | 2/2003 |

OTHER PUBLICATIONS

English Abstract of EP 0936053.

* cited by examiner

*Primary Examiner*—Robert B Davis
*Assistant Examiner*—Joseph Leyson
(74) *Attorney, Agent, or Firm*—Dykema Gossett PLLC

(57) ABSTRACT

The invention relates to a calibrating plate for an extrusion die for producing plastic profiles, comprising a substantially plate-shaped basic body (21), in which an opening (22) for guiding and calibrating the plastic profile (23) to be produced is provided, with at least one insert part (1) made of a material with high hardness being inserted into the basic body (21), which insert part comprises at least one holding section (2) and a shaping section (3), with both the holding section (2) as well as the shaping section (3) being formed partly as cylindrical surfaces with generatrices parallel to the extrusion axis (6), and with the insert part (1) being held in the axial direction in the plate-shaped basic body (21) by a delimiting stop (5). A longer service life and a simpler adjustment can be achieved in such a way that the holding section (2) comprises a groove (4) which extends in the direction of extrusion (6a), and that the delimitation stop (5) is arranged at one end of the groove (4), which stop protrudes from the groove (4).

11 Claims, 7 Drawing Sheets

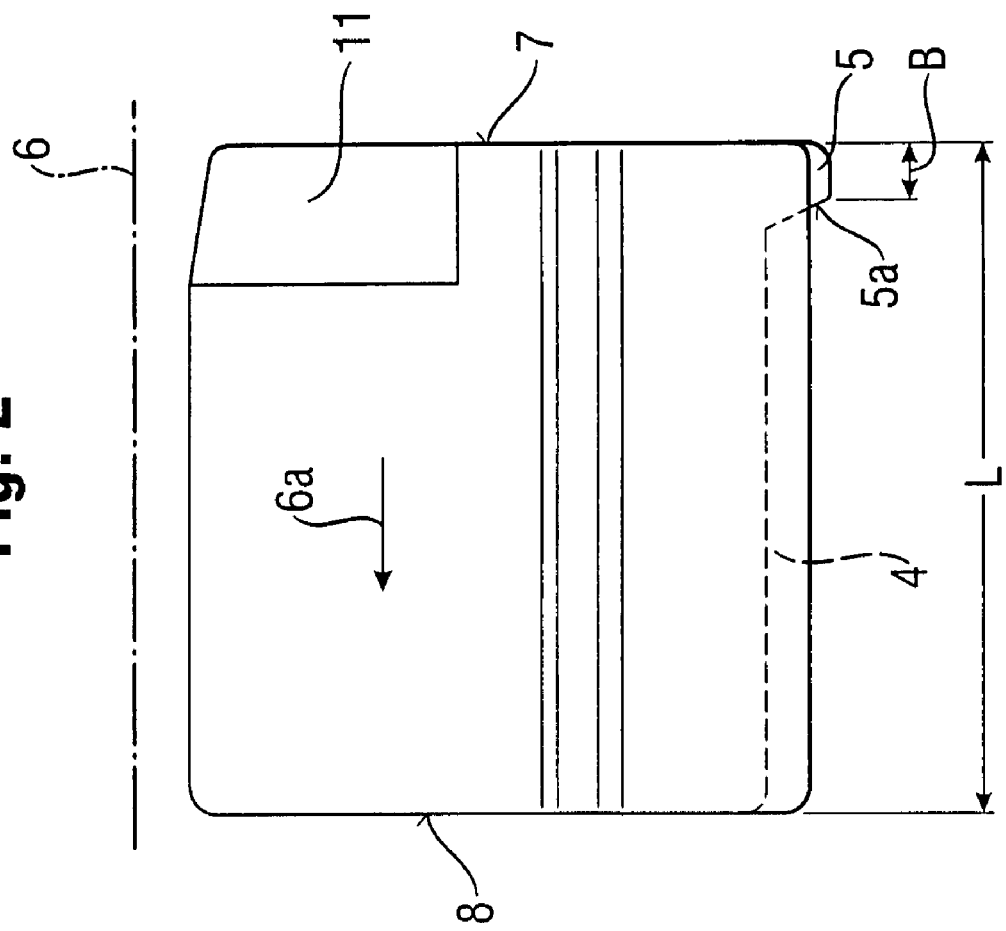
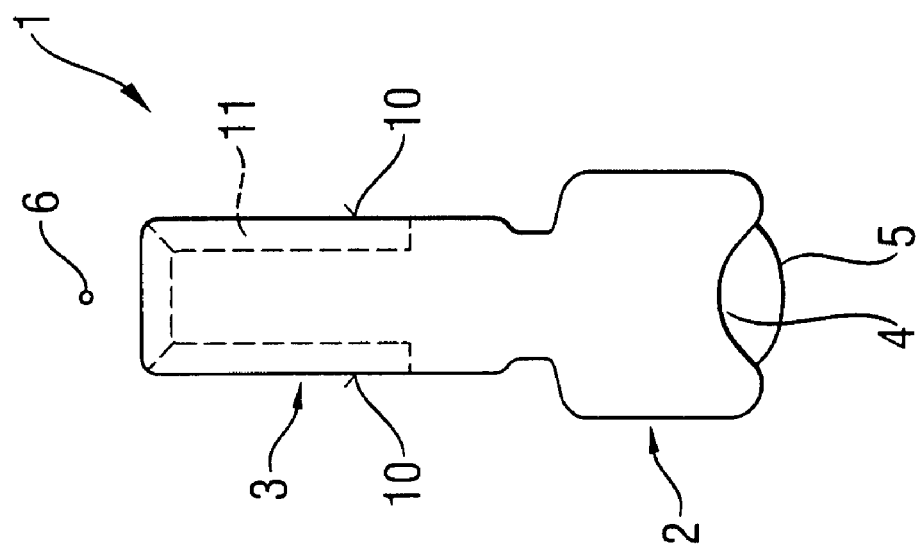

CALIBRATING PLATE FOR AN EXTRUSION DIE FOR PRODUCING PLASTIC PROFILES

The invention relates to a calibrating plate for an extrusion die for producing plastic profiles, comprising a substantially plate-shaped basic body, in which an opening for guiding and calibrating the plastic profile to be produced is provided, with at least one insert part made of a material with high hardness being inserted into the basic body, which insert part comprises at least one holding section and a shaping section, with both the holding section as well as the shaping section being formed partly as cylindrical surfaces with generatrices parallel to the extrusion axis and with the insert part being held in the axial direction in the plate-shaped basic body by a delimiting stop.

The service life of calibration tools in general and calibrating plates in particular depends primarily from the wear and tear at critical sections of the shape of the profile. Such critical sections are especially grooves which are determined for example for receiving seals. The projections of the calibrating plates which are intended for shaping and calibrating such grooves wear off especially quickly and are therefore critical to the service life of the calibrating plate and the calibration tool.

In order to avoid these disadvantages and to increase the service life of the die, insert parts have become known which consist of a material with an especially high hardness or abrasion hardness. Therefore such known insert parts are made of hard metal or sintered materials for example.

One problem however is the fastening of the insert parts in the calibrating plates. Solutions are known in which the calibrating plates are provided with a multi-part configuration in order to hold the insert parts, as is described in U.S. Pat. No. 5,626,807 A. EP 936 053 describes a wedge connection for fastening the insert parts. Other known solutions show press fits or glued connections. The common aspect in all such solutions is that the production is complex and that mounting and especially dismounting of the insert parts lead to an especially high amount of work and is susceptible to faults.

One solution which avoids the above problems at least in part has been described in DE 102 22 922 A. In this solution, the insert part is held by a guide surface and secured in the axial direction by a stop. The stop extends over a majority of the circumferential section of the holding part. It has been seen that in the case of the occurrence of production tolerances, as cannot be fully avoided in highly wear-proof components, a loose seat of the insert parts may occur, which obviously is undesirable. In particular, there may be slight pivoting movements about the longitudinal axis which lead to a deterioration in the profile quality and reduce the service life of the die because the guide parts are knocked out.

It is the object of the present invention to provide a solution which avoids such disadvantages and ensures a secure seat of the insert parts.

These objects are achieved in accordance with the invention in such a way that the holding section comprises a groove which extends in the direction of extrusion and which is situated in a region of the holding section which is precisely opposite of the shaping section, and that the delimitation stop is arranged at one end of the groove, which stop protrudes from the groove.

The relevant aspect in the invention is that a pivoting movement of the insert part about the extrusion axis is provided by the groove, with any play being suppressed in such a way that as a result of the frictional forces as exerted by the produced profile on the insert part a torque is exerted about an axis perpendicular to the direction of extrusion which substantially goes through the delimitation stop. As a result, the groove is pressed against its counterpart, the projection of the calibration plate, in the downstream section of the insert part and any play is excluded. An especially secure lateral guidance is thus achieved.

An especial advantage of the present invention is that in the basic body of the calibrating plate there are virtually only cylindrical surfaces, i.e. surfaces which consist of generatrices which are parallel to the extrusion axis. Merely the recess for the delimitation stop must be incorporated separately.

The insert parts of the invention can be arranged as standard parts which are exchangeable and can be recycled. The exchangeability is facilitated in such a way that the insert parts are held without any plastic deformation in the basic body of the calibrating plate, as is necessary in the solution according to DE 102 22 922 A for example, in order to ensure a respective seat of the insert part.

The system in accordance with the invention further enables a very simple production of both the insert part as well as the calibrating plate.

An especially simple solution is achieved in such a way that the groove of the holding section has a cross section in the form of a segment of a circle. Especially sharp edges are thus avoided and large radii of curvature are achieved, which is advantageous both with respect to the occurring tensions as well as with respect to the production of the insert part. The configuration can thus be simplified especially in such a way that the holding section outside of the groove consists only of cylindrical surfaces with generatrices which are parallel to the extrusion axis.

A further, especially advantageous embodiment of the invention provides that the holding section has a largest width which is larger than the largest width of the shaping section. An especially secure anchoring of the insert part in the basic body of the calibrating plate can thus be ensured.

An especially advantageous solution provides that the delimitation stop is arranged at the upstream end of the holding section. Optimal torque can thus be achieved, which clamps the insert part securely in the basic body of the calibrating plate in operation. It has been seen as especially advantageous in this connection when the delimitation stop is arranged within a section which does not amount to more than 10%, preferably not more than 6%, of the length of the insert part, calculated from the upstream face surface.

It is especially advantageous when the delimitation stop has a stop surface which is inclined relative to the extrusion axis. This leads to a simplification in production.

An especially advantageous embodiment of the invention provides that the groove is situated in a region of the holding section which is precisely opposite of the shaping section. In the case of a symmetrical insert part this means that the groove is symmetrical to the plane of symmetry of the entire part. But even in cases when the insert part is not entirely symmetrical, the groove should be arranged symmetrical to a plane which comes as close as possible to a plane of symmetry. This ensures that the torque which is exerted by the frictional forces from the profile to the insert part generates a force acting perpendicularly on the groove, without exerting a moment which tries to twist the insert part from the direction of extrusion.

It is especially advantageous when the insert part is produced by power injection molding. Power injection molding (PIM) is a special production method in which a special metal or ceramic powder is mixed with a suitable plastic and is processed in the manner of plastic injection molding into respective shaped parts. As a result of the advantage thus produced, the plastic portion, the so-called binder, is removed thermally or chemically/physically in a subsequent processing process, so that a porous metal or ceramic body is obtained. It is sintered into a finished part under high temperatures under respective shrinkage.

Power injection molding allows producing components of even complex geometry in larger numbers in a cost-effective manner. Highest requirements placed on the properties of the material can be fulfilled. By application of this method it is possible in contrast to conventional sintering methods to produce insert parts without subsequent treatment which are provided with run-up inclines for example.

Moreover, an especially easy adjustment of the extrusion die can be achieved in such a way that a kit of components is available which comprises a shaping section which is offset to a different extent relative to the holding section. When adjusting die systems it is always necessary to make slight geometrical changes to the calibrators in order to achieve the desired profile shape and quality. This is a complex process which requires a high amount of work for the staff and equipment. By providing a kit of insert parts, said adjustment work can be facilitated substantially. The individual insert parts have slight geometrical differences, so that by exchanging the respective insert parts the geometry of the die can be changed in a simple way until the desired result is obtained.

The invention is now explained in closer detail by reference to embodiments shown in the drawings, wherein:

FIG. 1 shows an insert part in accordance with the invention in a rear view;

FIG. 2 shows the insert part of FIG. 1 in a side view;

Figure 3:
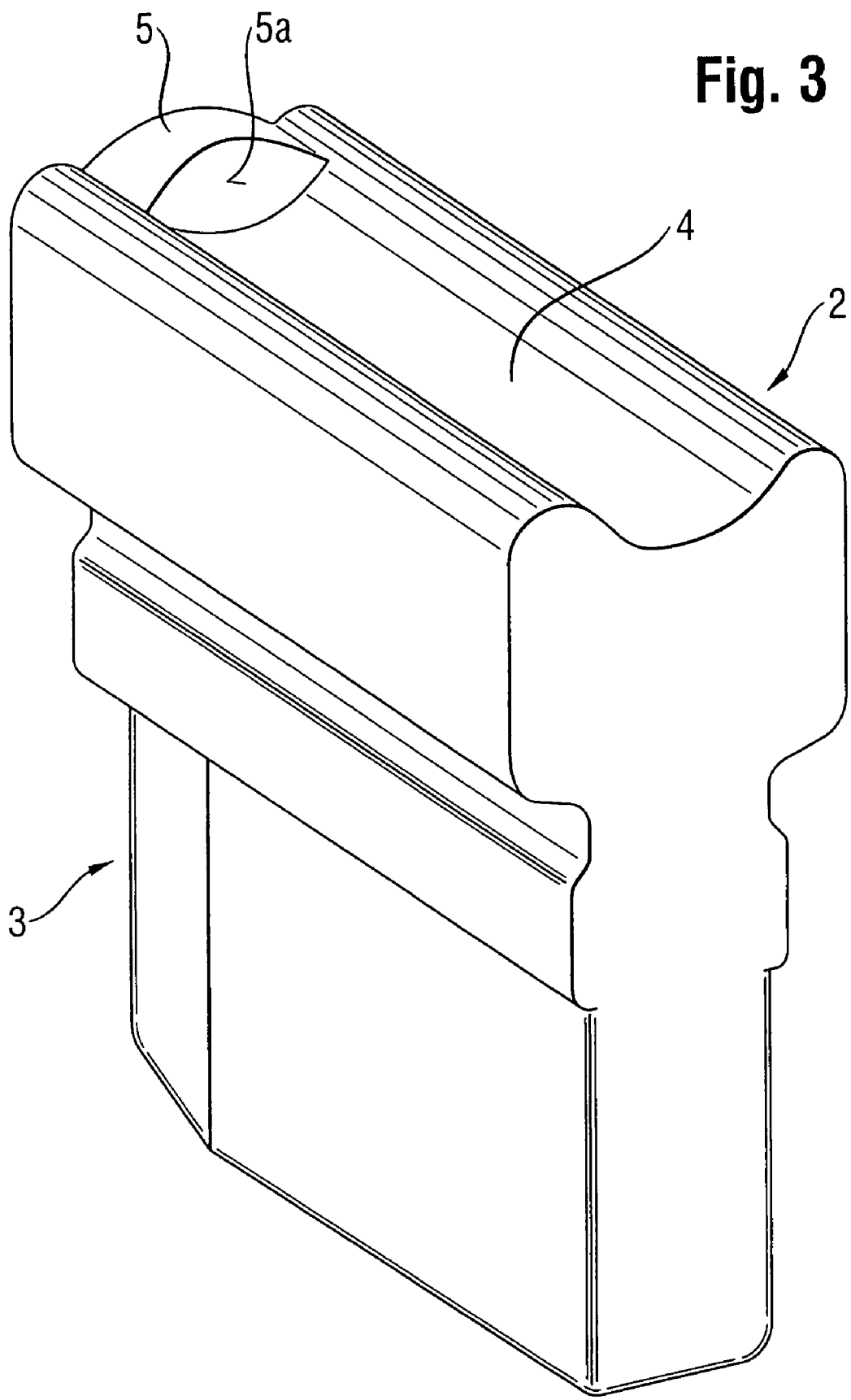
Figure 4:
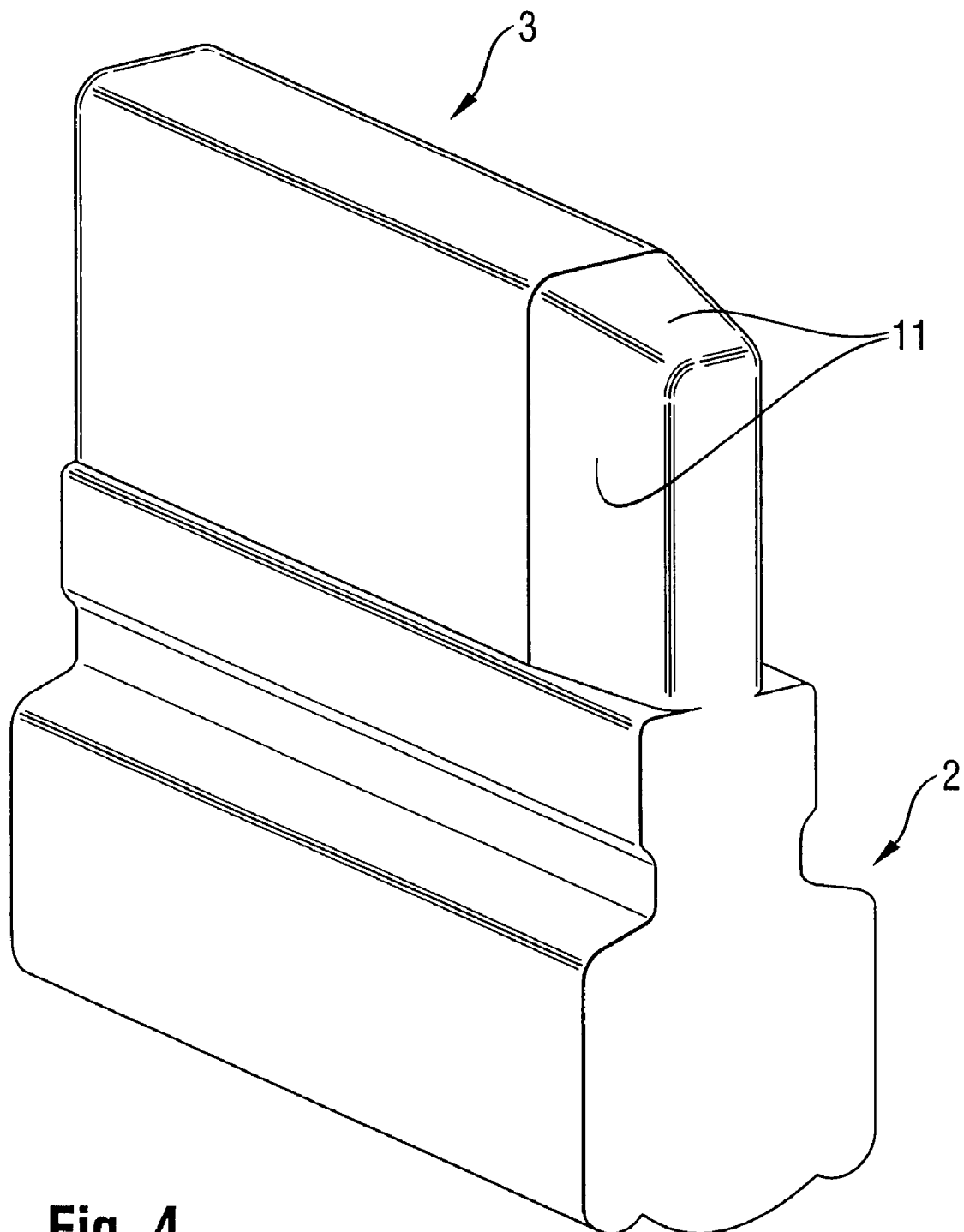
Figure 5:
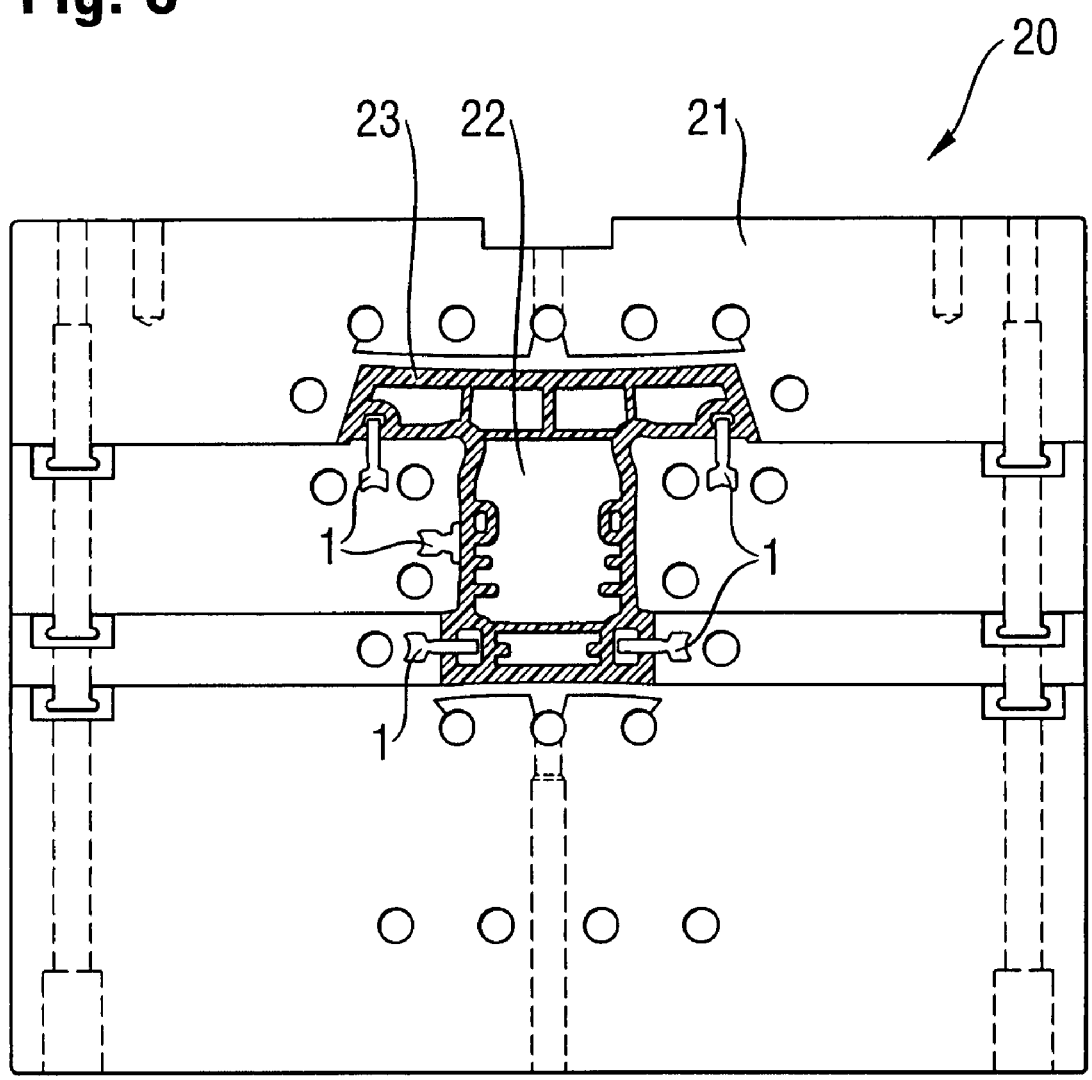
Figure 6:
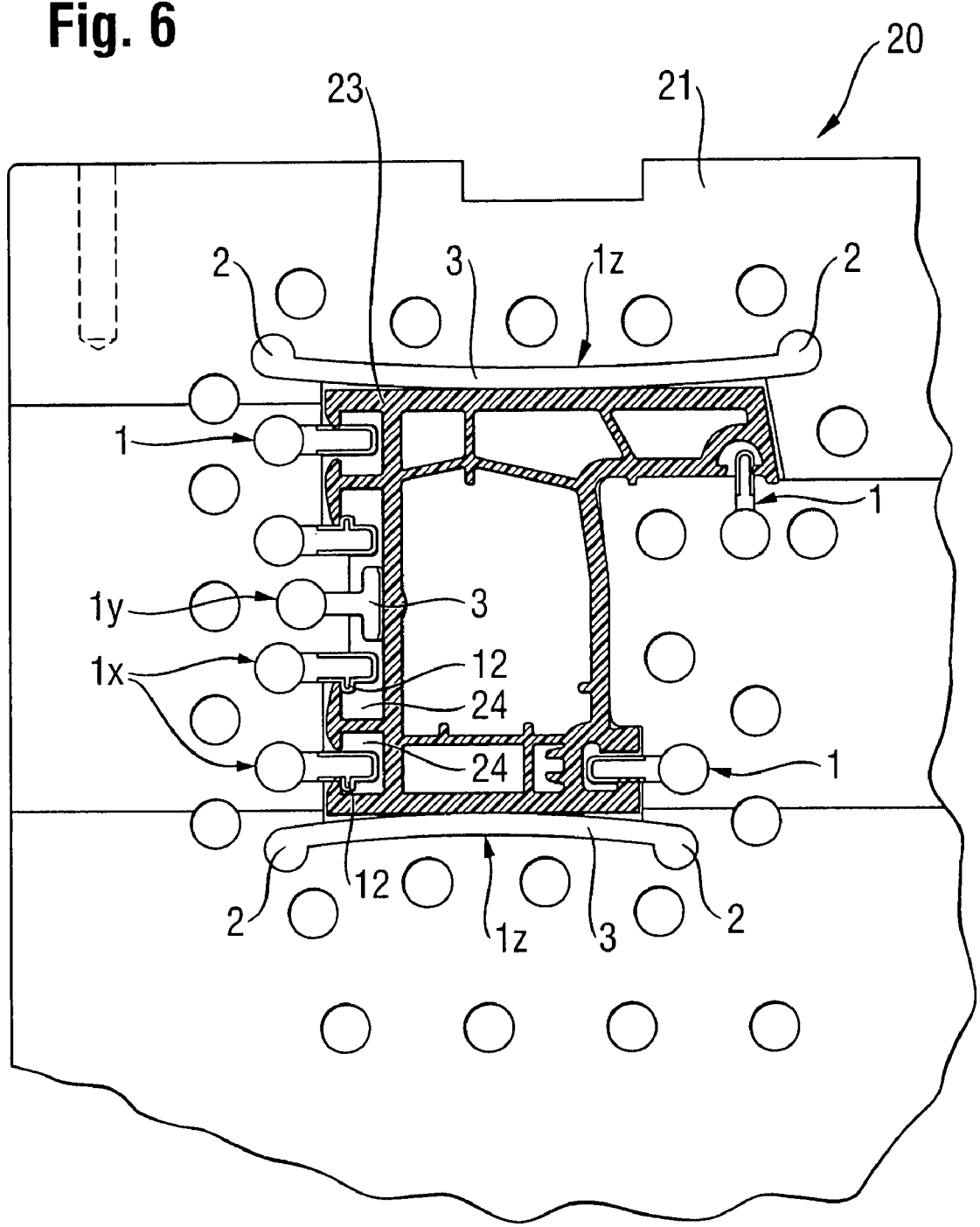
Figure 7:
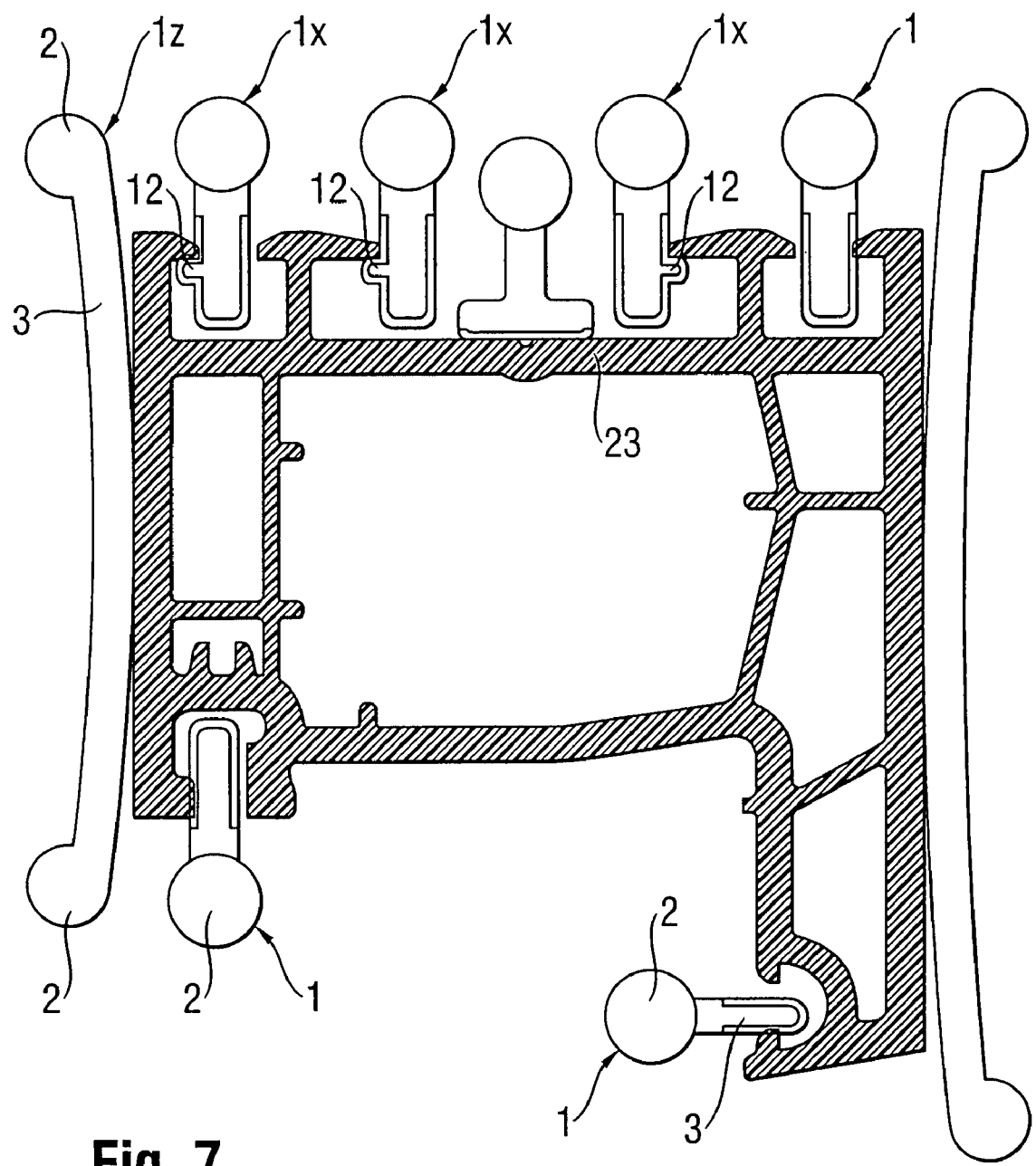

FIG. 3 and FIG. 4 each show an insert part in accordance with the invention in an axonometric view;

FIG. 5 shows an embodiment of a calibrating plate in a top view;

FIG. 6 shows an alternative embodiment of a calibrating plate;

FIG. 7 shows a detail of FIG. 6; and

Figure 8:
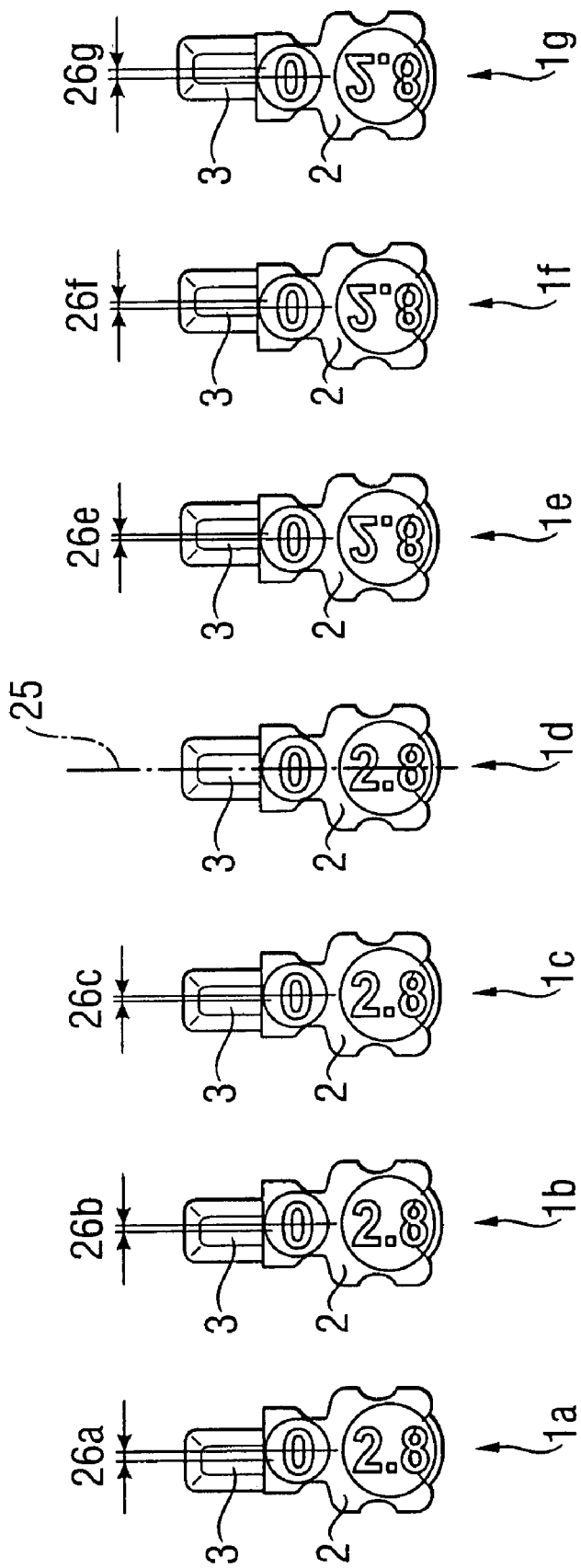

FIG. 8 shows a kit of insert parts.

The insert part 1, which is shown in FIGS. 1 and 2, principally consists of a holding section 2 and a shaping section 3. On the bottom side of the shaping section 3 there is a groove 4 with a cross section which has the shape of a sector of a circle. At one end of groove 4, a delimitation stop 5 protrudes from the base of the groove, which stop is provided to keep the insert part 1 in the axial direction. The extrusion axis or an axis parallel thereto is generally designated with reference numeral 6. FIG. 2 additionally shows the direction of extrusion with the part 6a. It is shown that the delimitation stop 5 is arranged directly on the upstream face surface 7 of the insert part 1. Apart from the delimitation stop 5, the holding section 2 is composed only of the cylindrical surfaces 9. These are surfaces which consist of generatrices which are parallel to the extrusion axis 6.

FIG. 2 shows that the delimitation stop 5 has an extension B in the axial direction which corresponds approximately to one-tenth of the total length L of the insert part. A stop surface 5a of the delimitation stop 5 is inclined relative to the plane of the upstream face surface 7. The shaping section 3 comprises two mutually parallel longitudinal sides 10 which are provided on the upstream side with inlet inclines 11 which are arranged at an angle of approximately 10° and facilitate the run-up of the profile (not shown here).

FIG. 5 shows a calibrating plate 20 with a plate-like basic body 21 which comprises an opening 22 for calibrating a plastic profile 23. Insert parts 1 are inserted at a total of five critical points of the profile, which insert parts act upon the circumference of the profile 23.

An alternative calibrating plate 20 is shown in FIG. 6. A larger number of insert parts 1, 1x, 1y, 1z is provided in this case. The insert parts 1 correspond to the embodiment as shown in FIGS. 1 to 4. The insert parts 1x comprise additional projections 12 which grasp behind a groove 24 of profile 23 in order to achieve a precise formation of the groove. The insert parts 1y comprise a T-shaped shaping section 3 for forming plane surface sections of profile 23. The insert parts 1z comprise a large-surface, slightly curved shaping section 3 which is held by two holding sections 2 in the basic body 21 of calibrating plate 20 in order to accordingly form the sight sizes.

FIG. 7 shows the profile 23 plus insert parts 1, 1x, 1y and 1z on an enlarged scale in detail. FIG. 7 shows that the profile 23 is partly penetrated in its desired geometrical shape by the insert parts 1, 1x, 1y and 1z. The reason is that the insert parts 1, 1x, 1y and 1z are arranged in the calibrating plate 20 in such a way that the profile 23 is partly displaced and needs to deform elastically, as a result of which respective pressing forces for calibrating the profile 23 are generated.

FIG. 8 shows in a exemplary way a kit of seven insert parts 1a, 1b, 1c, 1d, 1e, 1f, 1g, with the insert part 1d having the nominal dimensions and being symmetrical relative to a perpendicular plane 25. The insert parts 1a, 1b, 1c differ from the inset part 1d in such a way that the shaping section 3 is offset to the left by a predetermined slight amount 26a, 26b, 26c relative to the holding section 2. Conversely, the insert parts 1e, 1f and 1g are offset to the right by an amount 26e, 26f, 26g. The dimensions 26a, 26b, 26e, 26f, 26g are graduated in a fitting manner, e.g. in steps of 0.1 mm for example. If it is noticed during initial adjustment, which is started with insert part 1d, that a different geometry of the insert part is required for optimizing the profile 23, the insert part 1d is removed and replaced by one of the remaining insert parts 1a, 1b, 1c or 1e, 1f, 1g. In this way the geometry of the calibrating plate 20 can be adjusted easily to the respective requirements without having to conduct any machining of the material.

The present invention allows producing calibrating tools which can be adjusted substantially more easily and simply and which have a longer service life than known tools.

The invention claimed is:

1. A calibrating plate for an extrusion die for producing plastic profiles, comprising a substantially plate-shaped basic body, in which an opening for guiding and calibrating the plastic profile to be produced is provided, with at least one insert part made of a material with high hardness being inserted into the basic body, which insert part comprises at least one holding section and a shaping section, with both the holding section as well as the shaping section being formed partly as cylindrical surfaces with generatrices parallel to the extrusion axis, and with the insert part being held in the axial direction in the plate-shaped basic body by a delimiting stop, said holding section comprising a groove which extends in the direction of extrusion and which is situated in a region of the holding section which is precisely opposite of the shaping section, and said delimitation stop being arranged at one end of the groove, which stop protrudes from the groove.

2. A calibrating plate according to claim 1, wherein the groove of the holding section has a cross section in the form of a segment of a circle.

3. A calibrating plate according to claim 1, wherein the holding section outside of the groove consists only of cylindrical surfaces with generatrices which are parallel to the extrusion axis.

4. A calibrating plate according to claim 1, wherein the holding section has a largest width which is larger than the largest width of the shaping section.

5. A calibrating plate according to claim 1, wherein the delimitation stop is arranged at the upstream end of the holding section.

6. A calibrating plate according to claim 5, wherein the delimitation stop is arranged within a section which does not amount to more than 10% of the length of the insert part, calculated from the upstream face surface.

7. A calibrating plate according to claim 6, wherein the delamination stop is arranged within a section which does not amount to more than 6% of the length of the insert part.

8. A calibrating plate according to claim 1, wherein the delimitation stop has a stop surface which is inclined relative to the extrusion axis.

9. A calibrating plate according to claim 1, wherein the shaping section comprises two longitudinal sides which are parallel to each other.

10. A calibrating plate according to claim 1, wherein the insert part is produced by powder injection molding.

11. A calibrating plate according to claim 1, wherein a kit of insert parts is available, which insert parts comprise a shaping section which is offset to a different extent relative to the holding section.

* * * * *